United States Patent
Sun et al.

(10) Patent No.: US 7,917,165 B2
(45) Date of Patent: *Mar. 29, 2011

(54) POWER CONTROL METHOD FOR BASE STATION

(75) Inventors: Jianxun Sun, Shanghai (CN); Tiezhu Xu, Shanghai (CN)

(73) Assignee: Shanghai Ultimate Power Communications Technology Co., Ltd., Shanghai (CN)

( * ) Notice: Subject to any disclaimer, the term of this patent is extended or adjusted under 35 U.S.C. 154(b) by 593 days.

This patent is subject to a terminal disclaimer.

(21) Appl. No.: 11/915,103

(22) PCT Filed: May 15, 2006

(86) PCT No.: PCT/CN2006/000966
§ 371 (c)(1),
(2), (4) Date: Dec. 7, 2007

(87) PCT Pub. No.: WO2006/122489
PCT Pub. Date: Nov. 23, 2006

(65) Prior Publication Data
US 2008/0194281 A1    Aug. 14, 2008

(30) Foreign Application Priority Data
May 20, 2005   (CN) ............... 2005 1 0071186

(51) Int. Cl.
*H04B 7/00* (2006.01)
(52) U.S. Cl. ........ 455/522; 455/69; 455/127.1; 455/509
(58) Field of Classification Search ............ 455/522, 455/69, 452.1, 452.2, 13.4, 509, 516, 517, 455/507, 67.11, 127.1; 370/210, 254, 318, 370/203
See application file for complete search history.

(56) References Cited

U.S. PATENT DOCUMENTS

| 5,603,096 | A | 2/1997 | Gilhousen et al. ............ 455/69 |
| 5,812,938 | A | 9/1998 | Gilhousen et al. ............ 455/69 |
| 6,295,272 | B1* | 9/2001 | Feldman et al. ............ 370/210 |
| 6,377,813 | B1 | 4/2002 | Kansakoski et al. .......... 455/522 |
| 6,426,947 | B1* | 7/2002 | Banker et al. ............... 370/254 |
| 6,654,358 | B1* | 11/2003 | Park et al. .................. 370/318 |

FOREIGN PATENT DOCUMENTS

| CN | 1152384 | 6/1997 |
| CN | 1273715 | 11/2000 |

OTHER PUBLICATIONS

PCT International Search Report based on PCT/CN2006/000966 dated Aug. 16, 2007.

* cited by examiner

*Primary Examiner* — John Lee
(74) *Attorney, Agent, or Firm* — Greenberg Traurig, LLP; David J. Dykeman; Danielle T. Abramson

(57) ABSTRACT

The present invention discloses a power control method for a base station, including: adjusting, by the base station, a transmit power of a code-channel occupied by a terminal according to a power control command from the terminal; determining a permitted minimum code-channel power according to an adjusted transmit power of the code-channel occupied by the terminal; correcting the transmit power of the code-channel occupied by the terminal according to the minimum code-channel power; and transmitting signals to the terminal according to a corrected transmit power of the code-channel occupied by each terminal. By the present invention, the signal power difference between different users is controlled, the stability of the wireless link is improved, and the quality of system communication is guaranteed.

6 Claims, 3 Drawing Sheets

POWER CONTROL METHOD FOR BASE STATION

RELATED APPLICATIONS

This application is a national phase filing under 35 U.S.C. 371 of International Application No. PCT/CN2006/000966, filed on May 15, 2006, and claims the benefit of Chinese Application Number 200510071186.0, filed May 20, 2005, the entirety of these applications are hereby incorporated herein by reference for the teachings therein.

FIELD OF THE INVENTION

The present invention relates to the field of mobile communications, in particular, to a power control method for a wireless base station.

BACKGROUND OF THE INVENTION

A CDMA (Code Division Multiple Access) system is a self-interfering system, wherein a transmit power of a mobile station is an interference to other users occupying the same frequency in the cell, and a Near-Far Effect is a predominant problem. The so called Near-Far Effect refers to that, when mobile phones with different distances from the base station are used simultaneously, a signal with a higher power and nearer to the base station will suppress a signal with a lower power and farther from the base station. Therefore, it is expected to make the transmit power of each mobile station maintain a minimum level to meet the requirement for communication as far as possible, and to make the mobile station obtain a basically same power on the base station side regardless of the distance from the base station and the channel condition. A power control technology is a technology to overcome the Near-Far Effect for the CDMA system. It may decrease an average transmit power and reduce an inter-system and an intra-system interference.

The power control may be divided into an open loop type and a closed-loop type, wherein the closed-loop type power control may be further divided into an outer-loop power control and an inner-loop power control. Usually, the outer-loop sets target values (such as a received power target value and a signal-to-noise ratio target value, etc.) according to the quality of the service such as BER (Bit Error Rate) and BLER (Block Error Rate). The inner-loop adjusts the transmit power according to a comparison result between the signal quality and the target value set by the outer-loop.

According to directions of the link, the power control may also be divided into an uplink (backward) power control and a downlink (forward) power control.

Taking the inner-loop downlink power control as an example, the inner-loop downlink power control is accomplished by the base station with the assistance of a terminal. The terminal measures the signal quality (such as the received power or the signal-to-noise ratio) and compares the signal quality with the target value. If the signal quality is greater than the target value, a command for decreasing the transmit power is generated; otherwise, a command for increasing the transmit power is generated. If the transmit power needs not to be changed, in other words, if it is allowed that the transmit power is not adjusted when the signal quality is in a certain range around the target value, then in the above determination process, it is determined that the command for decreasing the transmit power is generated when the signal quality is greater than the target value by a certain threshold and the command for increasing the transmit power is generated when the signal quality is less than the target value by a certain threshold; otherwise, a command for not changing the transmit power is generated. Then, the control command is sent to the base station via a control channel or in other ways, and the base station performs a corresponding adjustment in a designated or predefined step size according to the received control command, so that the base station may keep an ideal transmit power.

In a practical wireless communication system, in the direction of the downlink, because the distances from different terminals to the base station are different, the required transmit powers meeting the quality of the service are also different. Usually, the transmit power of the base station needed by the terminal farther from the base station is higher, and the transmit power of the base station needed by the terminal nearer to the base station is lower. If the base station does not employ the downlink power control technology, the transmit power of the base station for each terminal is the same, and no Near-Far Effect exists. However, the transmit power of the base station must be configured according to the coverage area or the terminal farthest from the base station, thus great power will be wasted, the inter-system interference will be increased, and the system capacity will be limited. If the downlink power control technology is employed, the transmit power of the base station for each terminal will be different, thus the Near-Far Effect may occur. If the difference between the transmit powers is too great, a signal with low power may be submerged in a signal with high power at any moment, and the stability of the wireless link will be influenced, thus the quality of communication may not be guaranteed. However, the power difference between signals may also be resolved or overcome in other technical solutions, such as the joint detection technology. Theoretically, ideal joint detection may completely overcome the Near-Far Effect. However, it is difficult to be implemented in practice. In the prior system, it usually employs a suboptimal joint detection algorithm or a joint detection algorithm simplified according to a certain model hypothesis, thus, the ability to overcome Near-Far Effect is limited. Too large power difference will degrade the demodulation performance.

In an existing base station downlink transmit power adjustment policy, only the received downlink power control command is considered, and the corresponding signal transmit power will be adjusted according to the received control command as long as the signal transmit power is in the transmit power range of the base station. However, because the transmit power difference between different signals is not considered, the signal power difference may be too large. When the difference exceeds a certain range, a signal with lower power will be submerged in a signal with higher power and thus be interfered. Therefore, the required signal may not be demodulated correctly, the quality of communication will be degraded, and even the out-of-synchronization or off-line may be caused. When the terminal uses the joint detection algorithm, the detection of the signal with low power may not be accurate, so that the detection and demodulation of the signal with high power may also be influenced, and the quality of the communication may be degraded.

SUMMARY OF THE INVENTION

Therefore, an object of the present invention is to provide a power control method for a base station, so that disadvantages of the base station in the prior art, such as the terminal demodulation performance is degraded and the wireless link becomes unstable when the power difference between users is too large, may be overcome and the quality of system communication may be guaranteed.

A power control method for a base station according to the present invention includes the steps of:

A. adjusting, by the base station, a transmit power of a code-channel occupied by a terminal according to a power control command from the terminal;

B. determining a permitted minimum code-channel power according to an adjusted transmit power of the code-channel occupied by the terminal;

C. correcting the transmit power of the code-channel occupied by the terminal according to the minimum code-channel power; and D. transmitting a signal to the terminal according to a corrected transmit power of the code-channel occupied by the terminal.

The step A includes:

demodulating the power control command of the terminal;

obtaining the transmit power of the code-channel occupied by the terminal; and adjusting the transmit power of the code-channel occupied by the terminal.

The transmit power of the code-channel occupied by the terminal is adjusted according to a step size designated via a signaling or a predefined step size.

The step of determining a permitted minimum code-channel power includes:

obtaining a maximum code-channel power in all the code-channels occupying the same carrier frequency and the same time slot; and taking a difference between the maximum code-channel power and a corresponding code-channel power difference threshold as the minimum code-channel power permitted by all the code-channels in the carrier frequency and the time slot.

The code-channel power difference threshold is designated via a signaling or is preset.

When the transmit power of the code-channel occupied by the terminal is lower than the minimum code-channel power permitted by all code-channels in the carrier frequency and the time slot, the transmit power of the code-channel occupied by the terminal is adjusted as the permitted minimum code-channel power; and when the transmit power of the code-channel occupied by the terminal is greater than or equal to the minimum code-channel power permitted by all code-channels in the carrier frequency and the time slot, the transmit power of the code-channel occupied by the terminal is unchanged.

In the present invention, when the base station adjusts the corresponding signal transmit power with a step size designated by the higher layer or predefined according to the received power control command of the terminal, the transmit power of the code-channel occupied by the terminal is calculated. Then, the adjusted signal transmit power is corrected according to the transmit power of all the code-channels occupying the same carrier frequency and the same time slot, and the power difference between the code-channels are limited in a range predefined or designated by the higher layer, so that problems in a CDMA system, such as the power difference between code-channels is too large with the downlink power control technology, may be solved.

The decrease of the power difference between different signals is also favourable to demodulate a signal with low power, thus the quality of system communication may be guaranteed, and the possibility of wireless link out-of-synchronization and even off-line may be lowered. In the present invention, because the object to be adjusted has a low power, other users may not be affected greatly when the signal transmit power is raised appropriately, and the present invention is favourable to improve the system capacity.

Therefore, by the present invention, the signal power difference between different users may be controlled, the stability of the wireless link may be improved, and the quality of system communication may be guaranteed.

DETAILED DESCRIPTION OF THE EMBODIMENTS

The concept of the present invention is as follow: when a base station adjusts a signal transmit power with a designated or predefined step size according to a received power control command of the terminal, the transmit power of the code-channel occupied by each terminal is calculated; then, the minimum code-channel power permitted by all code-channels in current carrier frequency and current time slot is determined according to the maximum code-channel power in the code-channels occupying the carrier frequency and the time slot; and then the signal transmit powers corresponding to all the code-channels in the current carrier frequency and the current time slot, which are adjusted according to the power control command, are corrected according to the minimum code-channel power; in all the code-channels of the current carrier frequency and the current time slot, if a power of a code-channel is lower than the permitted minimum code-channel power, the power will be corrected as the permitted minimum code-channel power, so that the power difference between the code-channels will be limited in a predefined or designated range. The base station transmits a signal according to the corrected transmit power.

The part for generating the power control command according to the present invention is the same as that in the existing power control technology, in other words, the power control command is also generated by a terminal. The terminal measures the signal quality (such as the received power or the signal-to-noise ratio) and compares the signal quality with a target value. If the signal quality is greater than the target value, a command for decreasing the transmit power is generated; otherwise, a command for increasing the transmit power is generated. If the system allows that the transmit power is not adjusted when the signal quality is in a certain range around the target value, then in the above determination process, it is determined that the command for decreasing the transmit power is generated when the signal quality is greater than the target value by a certain threshold and the command for increasing the transmit power is generated when the signal quality is less than the target value by a certain threshold; otherwise, a command for not changing the transmit power is generated. Then, the control command is sent to the base station via a control channel or in other ways.

When the terminal generates the control command, a plurality of signal quality parameters will be considered synthetically, or the power control command will be generated in conjunction with the difference between the signal power of all the code-channels in the same carrier frequency and the same time slot.

The above power control process is a closed-loop control process. Taking the SIR (Signal-to-Interference Ratio) of the received signal as an example, the process for generating the terminal control command is described.

Figure 1:
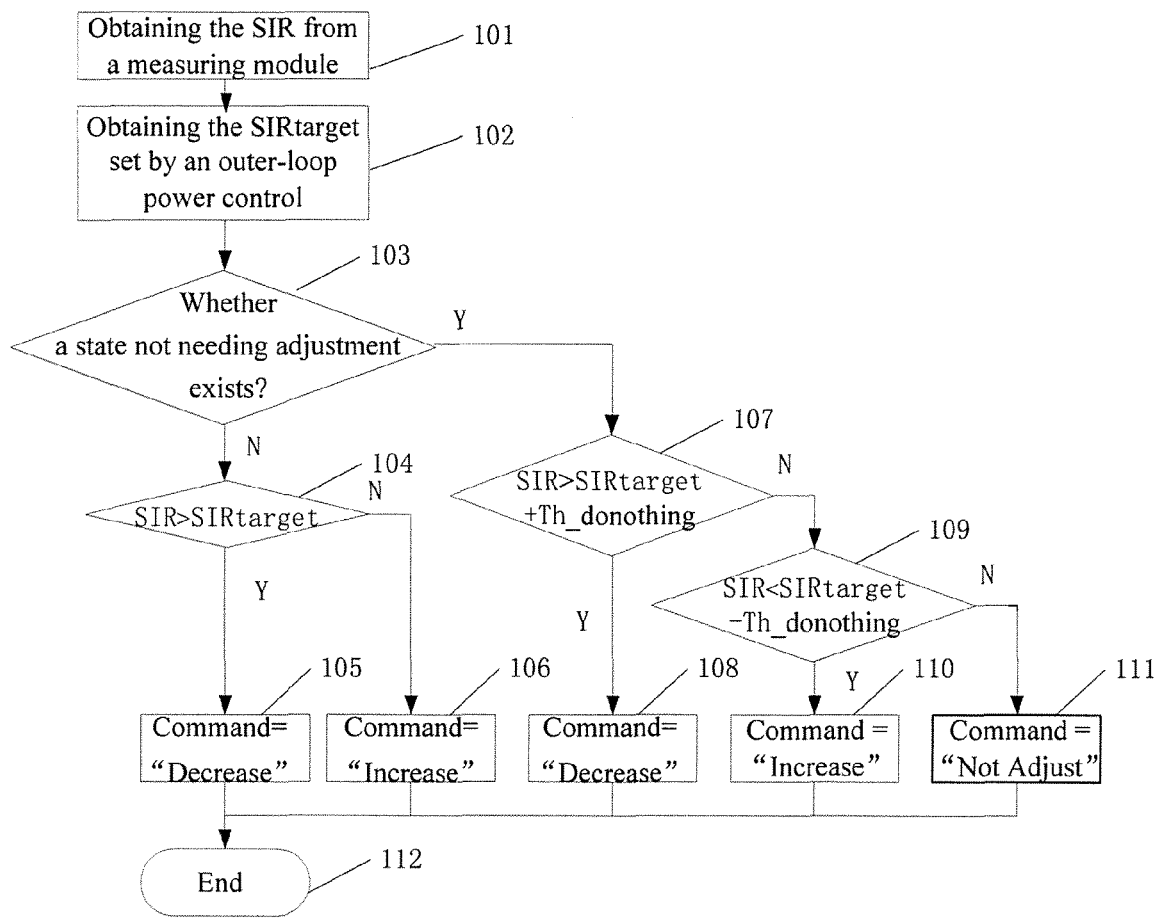
FIG. 1 is a flow chart showing a process in which a terminal generates a power control command using an SIR (Signal-to-Interference Ratio) before a demodulation.

FIG. 1 is a flow chart showing a process in which a terminal generates a power control command using an SIR before a demodulation, including the following steps.

Step 101: The SIR of a received signal is obtained from a measuring module.

Step 102: The SIR target value, SIRtarget, set by an outer-loop power control command is obtained.

Step 103: It is determined whether a state not needing adjustment exists;

If the state not needing adjustment does not exist, turn to Step 104 for determining whether the SIR is greater than the SIRtarget.

If SIR>SIRtarget, turn to Step 105 for generating the command for decreasing the transmit power; otherwise, turn to Step 106 for generating the command for increasing the transmit power.

If the state not needing adjustment exists, turn to Step 107 for determining whether the SIR is greater than the SIRtarget by a threshold Th_donothing, in other words, whether SIR>SIRtarget+Th_donothing.

If yes, turn to Step 108 for generating the command for decreasing the transmit power.

Otherwise, turn to Step 109 for continuing to determine whether SIR is lower than the SIRtarget by a threshold Th_donothing, in other words, whether SIR<SIRtarget−Th_donothing.

If yes, turn to Step 110 for generating the command for increasing the transmit power.

Otherwise, turn to Step 111 for generating the command not adjusting the transmit power.

Then, turn to Step 112 for ending.

The process for generating the power control command using other signal quality parameters is similar to the above process, and the description thereof will not be repeated.

After the terminal generates the power control command, the terminal sends the control command to the base station via a control channel or in other ways, and the base station adjusts the transmit power according to the received control command. In the present invention, the base station not only needs to adjust the transmit power according to the received control command, but also needs to correct the adjusted transmit power according to the minimum code-channel power permitted by current carrier and current time slot, so that the difference between the signal transmit powers of all the code-channels in the same carrier frequency and the same time slot may be equilibrated. Therefore, the system may be prevented from being influenced because the difference between the signal powers of different code-channels is too large, and the quality of system communication may be guaranteed.

To make the concept, characteristics and advantages of the present invention more apparent, the specific implementation process of the present invention will now be further described in detail.

Figure 2:
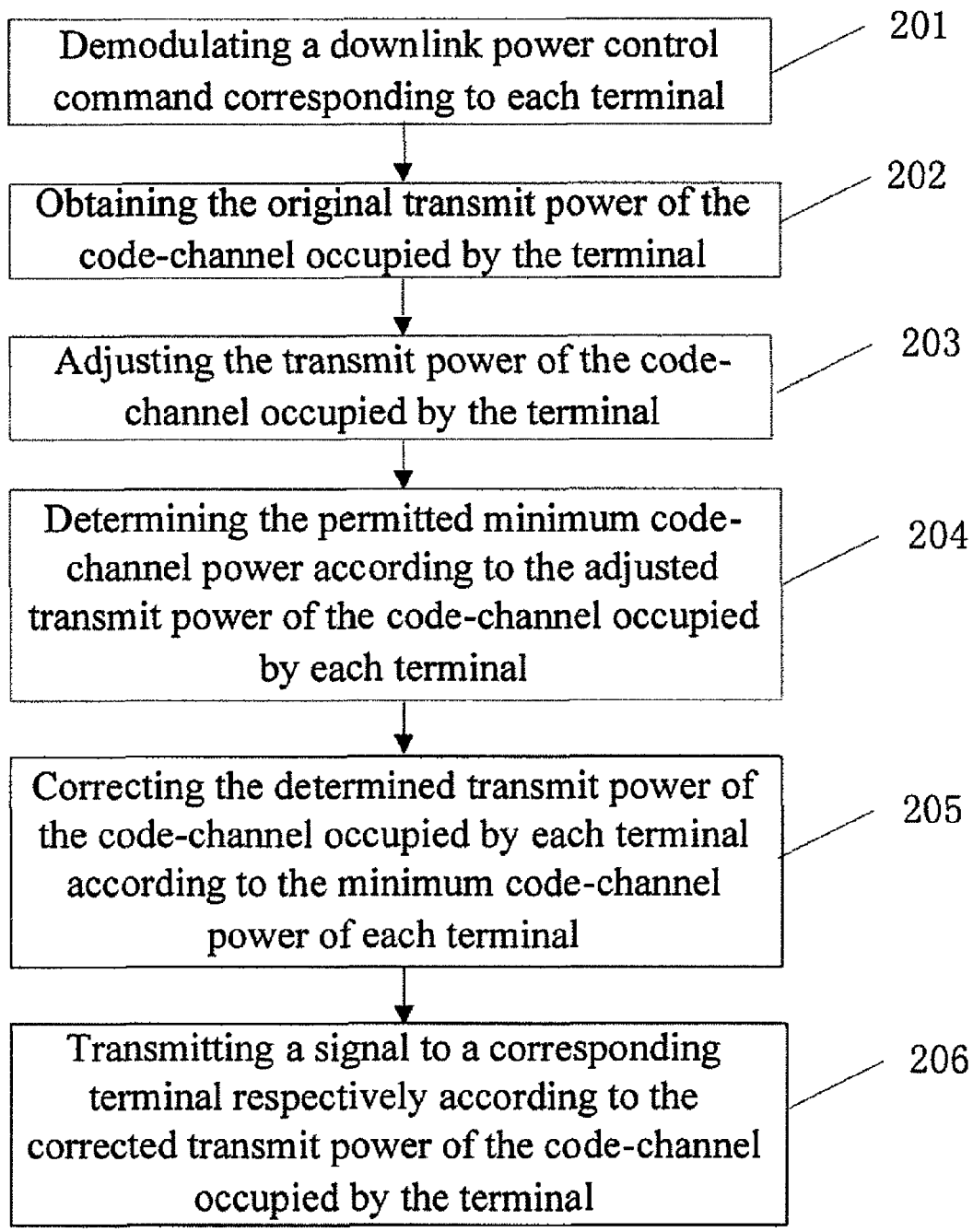
FIG. 2 is a flow chart showing the method according to the present invention.

FIG. 2 shows the implementation process of the method according to the present invention. Referring to FIG. 2, a method for controlling the power of the base station according to the present invention includes the following steps.

Step 201: A downlink power control command corresponding to the terminal is demodulated.

Step 202: The original transmit power of the code-channel occupied by the terminal is obtained.

Step 203: The transmit power of the code-channel occupied by the terminal is adjusted, wherein the power adjustment step size may be designated via the higher layer signaling or predefined by the base station.

Step 204: The permitted minimum code-channel power is determined according to the adjusted transmit power of the code-channel occupied by each terminal.

The minimum code-channel power permitted by all the code-channels in a code-channel set occupying the same carrier frequency and the same time slot may be determined as follows.

The power difference threshold of the code-channels occupying the same carrier frequency and the same time slot is designated via the higher layer signaling or is preset; the base station compares the adjusted signal powers of each code-channels and selects the maximum code-channel power in the current carrier frequency and the current time slot, and then subtracts the above code-channel power difference threshold, thus the minimum code-channel power permitted by all the code-channels in the current carrier frequency and the current time slot is obtained.

Step 205: The transmit power of the code-channel occupied by each terminal is corrected according to the determined minimum code-channel power of each terminal.

The transmit power of the code-channel occupied by each terminal may be corrected as follows.

When the transmit power of the code-channel occupied by the terminal is lower than the minimum code-channel power permitted by all the code-channels in the current carrier frequency and the current time slot, the transmit power of the code-channel occupied by the terminal is adjusted as the permitted minimum code-channel power.

When the transmit power of the code-channel occupied by the terminal is greater than or equal to the minimum code-channel power permitted by all the code-channels in the current carrier frequency and the current time slot, the transmit power of the code-channel occupied by the terminal is kept unchanged.

Alternatively, a power correcting threshold may also be preset. When the transmit power of the code-channel occupied by the terminal is lower than the minimum code-channel power permitted by all the code-channels in the current carrier frequency and the current time slot by an amount and the amount exceeds the threshold, the transmit power of the code-channel occupied by the terminal is adjusted in twice of the adjustment step size, and an alarm signal is sent to the higher layer.

Other correcting modes may also be employed as required, and the description thereof will not be described.

Step 206: The signal is transmitted to the corresponding terminal respectively according to the corrected transmit power of the code-channel occupied by each terminal.

Figure 3:
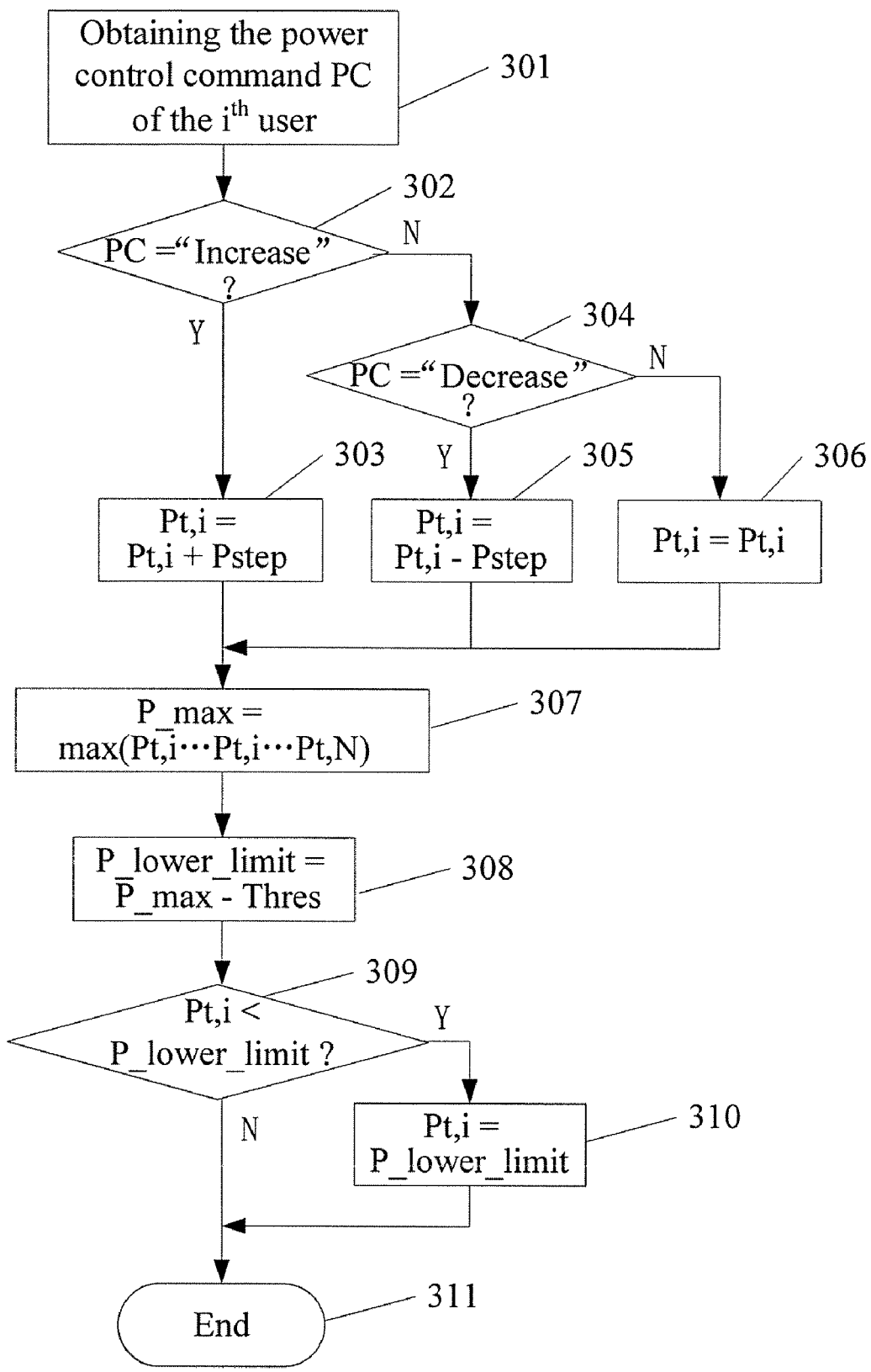
FIG. 3 is a flow chart showing a process in which the transmit power is corrected according to the present invention.

FIG. 3 is a flow chart showing a process in which the transmit power is corrected by the base station according to the method of the present invention.

Step 301: The power control command PC (PWRCTRL) of the $i^{th}$ user is obtained.

Step 302: It is determined that whether the control command PC (PWRCTRL) requests to increase the transmit power.

If yes, turn to Step 303 for adjusting the transmit power of the user signal, $Pt,i$, according to a step size Pstep designated via the higher layer signaling or predefined by the base station, in other words, $Pt, i=Pt, i+Pstep$.

If no, turn to Step 304 for further determining whether the control command requests to decrease the transmit power.

If yes, turn to Step 305 for adjusting the transmit power of the user signal, Pt,i, according to the step size Pstep designated via the higher layer signaling or predefined by the base station, in other words, Pt, i=Pt, i−Pstep.

Otherwise, turn to Step 306 for maintaining the original transmit power of the user signal, Pt,i.

After the above adjustment process, turn to Step 307 for selecting the maximum code-channel power from all the code-channels occupying the same carrier frequency and the same time slot, according to the calculated transmit power of the code-channel occupied by each terminal, and setting it as P_max, in other words, P_max=max(Pt, 1, . . . , Pt, i, . . . , Pt, M); wherein, it is assumed that there are totally N code-channels in the current carrier frequency and the current time slot, and correspondingly, there are M different users, and M<=N.

Step 308: Taking the difference between P_max and the power difference threshold Thres of the code-channel, occupying the same carrier frequency and the same time slot and predefined or designated by the higher layer, as the lower limit of the code-channel power, i.e., the minimum code-channel power of each terminal P_lower_limit; in other words, P_lower_limit=P_max-Thres;

Then, turn to Step 309 for determining whether the signal transmit power of the $i^{th}$ user, P t, i, which is adjusted according to the power control command, is less than the minimum code-channel power of each terminal P_lower_limit.

If P t, i<P_lower_limit, turn to Step 310 for correcting P t, i as P_lower_limit.

Otherwise, Pt, i is corrected, and the flow directly turns to Step 311 for endding the correcting process.

It can be seen that, in the present invention, by limiting the power difference between different code-channel signals occupying the same carrier frequency and the same time slot in the base station, the maximum power difference between the code-channels is kept in the range predefined or designated by the higher layer. Therefore, a series of problems in the CDMA system caused by the large power difference between code-channels due to the downlink power control technology may be overcome. Moreover, it is guaranteed that a signal with low power may be demodulated by the terminal, and it is favourable to improve the system capacity.

The present invention is applicable for all the wireless communication systems employing CDMA technology, such as TD-SCDMA (Time Division-Synchronous CDMA), WCDMA (Wideband CDMA), CDMA2000 and Narrowband CDMA IS95. In addition, the present invention is also applicable for other communication systems in which the quality of the received signal may be influenced by the large power level difference.

While the present invention has been illustrated and described with reference to some preferred embodiments, the present invention is not limited to these. Those skilled in the art should recognize that various variations and modifications can be made without departing from the spirit and scope of the present invention as defined by the accompanying claims.

The invention claimed is:

1. A power control method for a base station, comprising:
    A. adjusting, by the base station, a transmit power of a code-channel occupied by a terminal according to a power control command from the terminal;
    B. determining a permitted minimum code-channel power according to an adjusted transmit power of the code-channel occupied by the terminal, comprising obtaining a maximum code-channel power in all the code-channels occupying the same carrier frequency and the same time slot, and taking a difference between the maximum code-channel power and a corresponding code-channel power difference threshold as the minimum code-channel power permitted by all the code-channels in the carrier frequency and the time slot;
    C. correcting the transmit power of the code-channel occupied by the terminal according to the minimum code-channel power; and
    D. transmitting a signal to the terminal according to a corrected transmit power of the code-channel occupied by the terminal.

2. The method according to claim 1, wherein the step A comprises:
    demodulating the power control command of the terminal;
    obtaining the transmit power of the code-channel occupied by the terminal; and
    adjusting the transmit power of the code-channel occupied by the terminal.

3. The method according to claim 2, wherein, adjusting the transmit power of the code-channel occupied by the terminal according to a step size designated via a signaling or a predefined step size.

4. The method according to claim 1, wherein, the code-channel power difference threshold is designated via a signaling or is preset.

5. The method according to claim 1, wherein:
    when the transmit power of the code-channel occupied by the terminal is lower than the minimum code-channel power permitted by all code-channels in the carrier frequency and the time slot, adjusting the transmit power of the code-channel occupied by the terminal as the permitted minimum code-channel power; and
    when the transmit power of the code-channel occupied by the terminal is greater than or equal to the minimum code-channel power permitted by all code-channels in the carrier frequency and the time slot, keeping the transmit power of the code-channel occupied by the terminal unchanged.

6. A power control method for a base station, comprising:
    A. adjusting, by the base station, a transmit power of a code-channel occupied by a terminal according to a power control command from the terminal;
    B. determining a permitted minimum code-channel power according to an adjusted transmit power of the code-channel occupied by the terminal;
    C. correcting the transmit power of the code-channel occupied by the terminal according to the minimum code-channel power; and
    D. transmitting a signal to the terminal according to a corrected transmit power of the code-channel occupied by the terminal;
    wherein when the transmit power of the code-channel occupied by the terminal is lower than the minimum code-channel power permitted by all code-channels in the carrier frequency and the time slot, adjusting the transmit power of the code-channel occupied by the terminal as the permitted minimum code-channel power; and
    wherein when the transmit power of the code-channel occupied by the terminal is greater than or equal to the minimum code-channel power permitted by all code-channels in the carrier frequency and the time slot, keeping the transmit power of the code-channel occupied by the terminal unchanged.

* * * * *